United States Patent
Waltermann et al.

(10) Patent No.: US 10,531,279 B2
(45) Date of Patent: *Jan. 7, 2020

(54) METHODS AND ARRANGEMENTS FOR TRACKING AND LOCATING LAPTOPS

(71) Applicant: Lenovo (Singapore) Pte. Ltd., Singapore (SG)

(72) Inventors: Rod D. Waltermann, Rougemont, NC (US); Scott Edwards Kelso, Cary, NC (US); John Carl Mese, Cary, NC (US); Nathan J. Peterson, Oxford, NC (US); Arnold S. Weksler, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 15/420,913

(22) Filed: Jan. 31, 2017

(65) Prior Publication Data

US 2017/0142574 A1    May 18, 2017

Related U.S. Application Data

(63) Continuation of application No. 11/772,221, filed on Jun. 30, 2007.

(51) Int. Cl.
| | |
|---|---|
| *H04W 8/24* | (2009.01) |
| *H04W 64/00* | (2009.01) |
| *H04W 4/02* | (2018.01) |
| *G08B 13/14* | (2006.01) |
| *H04W 8/00* | (2009.01) |

(52) U.S. Cl.
CPC .......... *H04W 8/24* (2013.01); *G08B 13/1418* (2013.01); *H04W 4/025* (2013.01); *H04W 8/005* (2013.01); *H04W 64/00* (2013.01)

(58) Field of Classification Search
CPC ........ H04W 8/24; H04W 4/025; H04W 8/025
USPC ......................................................... 370/338
See application file for complete search history.

(56) References Cited

U.S. PATENT DOCUMENTS

| | | | | |
|---|---|---|---|---|
| 6,362,736 | B1* | 3/2002 | Gehlot | G08B 13/1436 340/539.1 |
| 2003/0005316 | A1* | 1/2003 | Girard | G06F 21/88 713/193 |
| 2003/0217137 | A1* | 11/2003 | Roese | G01S 5/02 709/223 |
| 2005/0149752 | A1* | 7/2005 | Johnson | G06F 21/88 726/4 |
| 2007/0121560 | A1* | 5/2007 | Edge | H04W 64/00 370/338 |

* cited by examiner

*Primary Examiner* — William Nealon
(74) *Attorney, Agent, or Firm* — Ference & Associates LLC

(57) ABSTRACT

An embodiment provides a method including: operating a plurality of receivers of a mobile computer to obtain information from two or more different types of wireless transmitting devices in a vicinity of the mobile computer; where the information comprises data relating to an access point and data relating to at least one other wireless transmitting device; where at least two of the two or more wireless transmitting devices transmit data using different communication modalities; transmitting the information from the mobile computer to a remote device; and thereafter obtaining a location of the mobile computer based on the information. Other embodiments are described and claimed.

20 Claims, 2 Drawing Sheets

METHODS AND ARRANGEMENTS FOR TRACKING AND LOCATING LAPTOPS

CROSS REFERENCE TO RELATED APPLICATIONS

This is a continuation application of U.S. patent application Ser. No. 11/772,221, filed on Jun. 30, 2007, the contents of which are incorporated by reference herein.

FIELD

The present application relates to methods and arrangements for tracking and locating portable computers such as laptops.

BACKGROUND

The terms "laptop", "laptop computer", "notebook" and "notebook computer", as broadly employed herein, should be understood to be interchangeable with one another and to broadly relate to essentially any type of portable computer as commonly understood in connection with any or all of those four terms.

Laptops, owing to their portability, easily lend themselves to theft or unauthorized removal (e.g., from a workplace setting) if concerted measures are not otherwise taken to mitigate such a likelihood.

Conventional arrangements have been developed that permit a laptop to transmit certain information such at its IP (Internet Protocol) address and its MAC (Media Access Control) address, after theft or removal, it is connected over a wireless or hard-wired Ethernet or Internet device. One such arrangement is the "COMPUTRACE" software manufactured by Absolute Software of Vancouver, BC, Canada (http://www.computrace.com) Additional information about a transmitted IP address(es) at the time of transmission may be obtained from the internet service provider (ISP) to whom the IP address is assigned or through various geolocation providers such as MaxMind LLC of Boston, Mass., United States (http://www.maxmind.com/app/ip-location). Obtaining the information from an ISP may invoke various privacy interests and require the assistance of law enforcement or judicial intervention. Additional information about a transmitted IP address(es), however, normally does not necessarily afford an accurate fix on the location of the laptop, meaning that recovery can be elusive or, at the very least, difficult. It will also be appreciated that accurately locating a laptop can be of assistance in locating an individual who needs to be found or traced for a variety of reasons (e.g., in a weather-related emergency, in connection with the elopement of a minor or abduction of an individual, etc.).

Accordingly, a need has been recognized in connection with providing a more accurate and reliable method of determining an initially unknown location of a laptop.

BRIEF SUMMARY

In accordance with at least one embodiment, there is broadly contemplated herein an arrangement for employing a host of receivers that may already be present in a laptop, to enable the laptop to collect a significant amount of data about its location. Once the system then finds a readily available connection, it can then transmit information about its location as well as other information to help pinpoint the location of the laptop.

In summary, one aspect provides a method comprising: operating a plurality of receivers of a mobile computer to obtain information from two or more different types of wireless transmitting devices in a vicinity of the mobile computer; wherein the information comprises data relating to an access point and data relating to at least one other wireless transmitting device; wherein at least two of the two or more wireless transmitting devices transmit data using different communication modalities; transmitting the information from the mobile computer to a remote device; and thereafter obtaining a location of the mobile computer based on the information.

Another aspect provides a mobile computer, comprising: a plurality of receivers; a CPU operatively coupled to the plurality of receivers; a system memory in communication with said CPU; and one or more modules executable by said CPU, wherein the one or more modules: operate a plurality of receivers to obtain information from two or more different types of wireless transmitting devices in a vicinity of the mobile computer; wherein the information comprises data relating to an access point and data relating to at least one other wireless transmitting device; wherein at least two of the two or more wireless transmitting devices transmit data using different communication modalities; transmit the information from the mobile computer to a remote device; and thereafter obtain a location of the mobile computer based on the information.

Furthermore, an additional aspect provides a program storage device readable by machine and embodying a program of instructions executable by the machine to: operate a plurality of receivers of a mobile computer to obtain information from two or more different types of wireless transmitting devices in a vicinity of the mobile computer; wherein the information comprises data relating to an access point and data relating to at least one other wireless transmitting device; wherein at least two of the two or more wireless transmitting devices transmit data using different communication modalities; transmit the information from the mobile computer to a remote device; and thereafter obtain a location of the mobile computer based on the information.

DETAILED DESCRIPTION

For a better understanding of the embodiments, together with other and further features and advantages thereof, reference is made to the following description, taken in conjunction with the accompanying drawings, and the scope of the invention will be pointed out in the appended claims.

Figure 1:
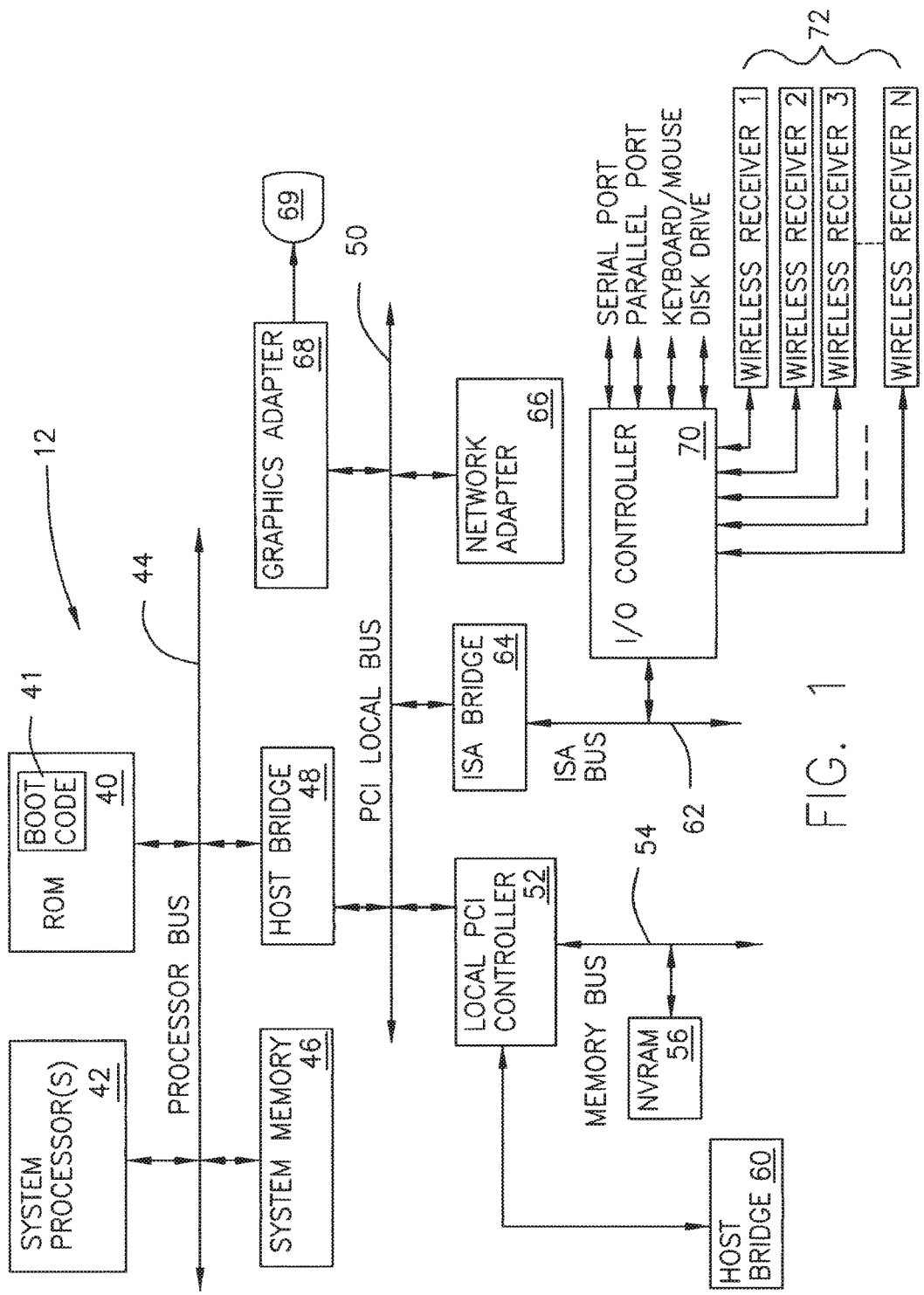
FIG. 1 is a block diagram of a laptop computer system.
Figure 2:
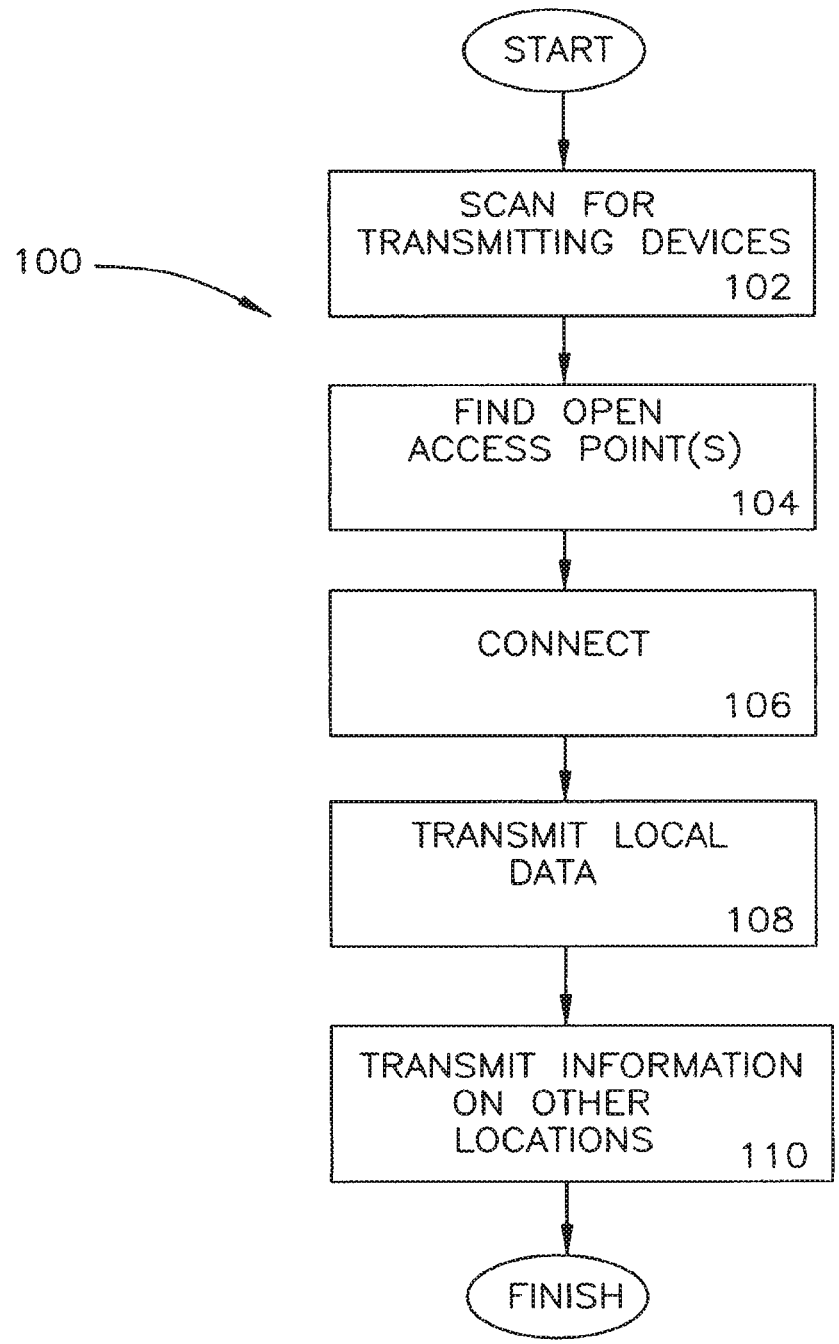
FIG. 2 schematically illustrates a process of locating a laptop.

It will be readily understood that the components, as generally described and illustrated in the Figures herein, may be arranged and designed in a wide variety of different configurations. Thus, the following more detailed description of the embodiments of the apparatus, system, and method, as represented in FIGS. 1 through 2, is not intended to limit the scope of the claims, but is merely representative of selected embodiments.

Functional units described in this specification may be labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment" or "an embodiment" (or the like) means that a particular feature, structure, or characteristic described in connection with the embodiment is included in at least one embodiment. Thus, appearances of the phrases "in one embodiment" or "in an embodiment" in various places throughout this specification are not necessarily all referring to the same embodiment.

Furthermore, the described features, structures, or characteristics may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments can be practiced without one or more of the specific details, or with other methods, components, materials, etc. In other instances, well-known structures, materials, or operations are not shown or described in detail to avoid obscuring certain aspects.

The illustrated embodiments will be best understood by reference to the drawings, wherein like parts are designated by like numerals or other labels throughout. The following description is intended only by way of example, and simply illustrates certain selected embodiments of devices, systems, and processes that are consistent with the claims.

Referring now to FIG. 1, there is depicted a block diagram of an illustrative embodiment of a computer system 12. The illustrative embodiment depicted in FIG. 1 may be a notebook computer system, such as one of the ThinkPad® series of personal computers sold by Lenovo (US) Inc. or a workstation computer; however, as will become apparent from the following description, the embodiments are applicable to essentially any data processing system, but preferably a portable computer system for which there may be a need to pinpoint its location.

As shown in FIG. 1, computer system 12 includes at least one system processor 42, which is coupled to a Read-Only Memory (ROM) 40 and a system memory 46 by a processor bus 44. System processor 42, which may comprise one of the line of processors produced by Intel Corporation, is a general-purpose processor that executes boot code 41 stored within ROM 40 at power-on and thereafter processes data under the control of operating system and application software stored in system memory 46. System processor 42 is coupled via processor bus 44 and host bridge 48 to Peripheral Component Interconnect (PCI) local bus 50.

PCI local bus 50 supports the attachment of a number of devices, including adapters and bridges. Among these devices is network adapter 66, which interfaces computer system 12 to LAN 10, and graphics adapter 68, which interfaces computer system 12 to display (or monitor) 69. Communication on PCI local bus 50 is governed by local PCI controller 52, which is in turn coupled to non-volatile random access memory (NVRAM) 56 via memory bus 54. Local PCI controller 52 can be coupled to additional buses and devices via a second host bridge 60.

Computer system 12 further includes Industry Standard Architecture (ISA) bus 62, which is coupled to PCI local bus 50 by ISA bridge 64. Coupled to ISA bus 62 is an input/output (I/O) controller 70, which controls communication between computer system 12 and attached peripheral devices such as a keyboard, mouse, and a disk drive. In addition, I/O controller 70 supports external communication by computer system 12 via serial and parallel ports.

It should be further understood that while FIG. 1 conveys specific hardware components that can be employed in accordance with embodiments, the concepts discussed and contemplated herein are of course applicable to a very wide variety of computer systems and constituent conventional components.

In accordance with at least one embodiment, there is broadly contemplated herein an arrangement for employing a host of receivers that may already be present in a laptop, to enable the laptop to collect a significant amount of data about its location. Once the system then finds a readily available connection, it can then transmit information about its location as well as other information to help pinpoint the location of the laptop.

Accordingly, in accordance with an environment in which the embodiments may be employed, computer system 12 is preferably a laptop or notebook computer system. As such, there will typically be provided a quantity of n wireless receivers (e.g., 1, 2, 3 . . . n) as indicated at 72, in communication with I/O controller 70 in known manner. These receivers may include, but are by no means limited to, a 802.11 receiver, a WWAN (Wireless Wide Area Network) receiver, an FM receiver, and/or a "BLUETOOTH" receiver.

It is recognized, in accordance with at least one embodiment, that at any time a system 12 can obtain a significant amount of data about its general location via conventional arrangements (e.g., IP address, operating system, "COMPUTRACE", etc.) together with and any or all of the receivers 72. Accordingly, when a system 12 is removed to another location (e.g., is stolen or taken without authorization), it may preferably begin to collect information about its surroundings via conventional arrangements together with radio signals, in a manner to be more fully appreciated herebelow. Thence, the system 12 may preferably find an available connection (preferably, an open access point such as a WiFi "hotspot") via which it may transmit information about its location. In that process, it may also preferably transmit information about other wireless devices from which it has received information, such as associated SSID's (Service Set Identifiers) and MAC addresses of such devices, as well as the signal strength of any such devices. This will help provide ample information via which the location of the system 12 can be pinpointed (e.g., via a triangulation of data on the wireless devices and the inter-relationship of such data).

FIG. 2 is a schematically illustrates a process 100 that may be undertaken in accordance with an embodiment in facilitating the locating of a laptop. Reference may also continue to be made to FIG. 1 as needed.

First, the wireless receivers 72 (FIG. 1) will preferably scan for other wireless transmitting devices in the vicinity (102). The number and types of wireless transmitting devices that can be scanned for are many and can include, for example, other laptops, cell phones, and FM radio stations, among very many other devices. In the process, routinely accessible information about such transmitting devices will preferably be obtained and stored as "snapshot" data (e.g., in system memory 46 [FIG. 1]). Thus, with regard to such transmitting devices, information such as MAC addresses, SSID's and, for FM radio stations, PTY/RDS (program type/radio data system) data will preferably be obtained. Also preferably obtained is a read on the signal strength of each wireless transmitting device for which data is being collected. Additional scans may be made, in known manner, for WWAN cell phone tower ID's in the vicinity.

Next, out of all the wireless transmitting points ascertained in step 102, at least one open access point is preferably located (104). In known manner, a connection is then preferably established with to one or more access points so found (106).

In a subsequent step, this "live" connection is preferably exploited to transmit to a central collection point information on the one or more access points being used (108). Further, other collected information ("snapshot" data) from step 102 regarding other local wireless transmitting devices (that do not necessarily correspond to available open access points) is also preferably transmitted to the central collection point (110). The central collection point can take any of a wide variety of conceivable forms; the "COMPUTRACE" software manufactured by Absolute Software of Vancouver, BC, Canada, affords such a data collection capability.

It should be appreciated, then, that once data is collected at the central data collection point regarding not only (a) the open access point via which information is being transmitted but also (b) other wireless transmitting devices, a triangulated estimate of the location of the laptop may be obtained. This of course, will be a much more accurate estimate than would have been possible if solely the location(s) of the one or more exploited open access points were known. Furthermore, it will be appreciated that the triangulation can be greatly aided with the signal strength information relating to each wireless transmitting device.

In accordance with at least one embodiment, the process 100 described hereinabove may be carried out in accordance with essentially any predetermined criteria. For instance, the laptop in question may be configured to always scan for transmitting devices (102) at predetermined intervals (e.g., every 15 minutes) regardless of the operating context or the status of the system (e.g., stolen or removed without permission). On the other hand, process 100 could be triggered by other factors such as a failure to enter a password associated with the laptop or a lack of a positive match in routine facial recognition as may be performed by a built-in camera.

Generally, it should be appreciated that, in accordance with at least one embodiment, a "wireless module" may comprise any or all of the wireless receivers 72 as shown in FIG. 1 along with any executable code which employs the receivers 72 for any of a variety of predetermined purposes. Accordingly, a wireless module in accordance with at least one embodiment may act to: obtain information relating to an open access point and to at least one other wireless transmitting device; finding an open access point; and transmit information regarding system location via transmitting information relating to the open access point and to at least one other wireless transmitting device.

Further, it will be appreciated from the foregoing that a wireless module may undertake any or all of the following specific acts: scan for wireless transmitting devices in a vicinity of a system location; ascertain, from scanned wireless transmitting devices, at least one open access point; establish a connection with at least one open access point; obtain, with regard to an open access point and at least one other wireless transmitting device, location information and signal strength information; store in system memory information relating to the at least one other wireless transmitting device for subsequent transmission; and obtain, from at least one wireless transmitting device, at least one item from the group consisting essentially of: a MAC address, a SSID, PTY/RDS data, and a WWAN cell phone tower ID.

If not otherwise stated herein, it is to be assumed that all patents, patent applications, patent publications and other publications (including web-based publications) mentioned and cited herein are hereby fully incorporated by reference herein as if set forth in their entirety herein.

Although illustrative embodiments have been described herein with reference to the accompanying drawings, it is to be understood that the claimed embodiments are not limited to those precise embodiments, and that various other changes and modifications may be affected therein by one skilled in the art without departing from the scope or spirit of the invention.

What is claimed is:

1. A method comprising:
operating, responsive to receiving an incorrect login attempt at a mobile computer, a plurality of receivers of the mobile computer to obtain information from two or more different types of wireless transmitting devices in a vicinity of the mobile computer when the mobile computer is not connected to a communications network;
wherein the information comprises two or more of: an access point ID, a cell phone tower ID, and signal strength information;
wherein at least two of the two or more wireless transmitting devices transmit data using different communication modalities;
transmitting, after connecting to a communications network, the information from the mobile computer to a remote device; and
thereafter obtaining a location of the mobile computer based on the information,
wherein the two or more different types of wireless transmitting devices comprise two or more fixed devices and mobile devices.

2. The method according to claim 1, further comprising detecting data indicative of an unauthorized access to the mobile computer prior to obtaining information from two or more different types of wireless transmitting devices in a vicinity of the mobile computer.

3. The method of claim 2, wherein said data indicative of an unauthorized access to the mobile computer comprises data indicating a predetermined number of failed login attempts.

4. The method of claim 1, wherein said information from two or more different types of wireless transmitting devices in a vicinity of the mobile computer comprises identification data.

5. The method of claim 4, wherein said information from two or more different types of wireless transmitting devices in a vicinity of the mobile computer comprises signal strength data.

6. The method of claim 1, wherein said operating comprises scanning for wireless transmitting devices in a vicinity of the mobile computer; and
wherein said transmitting further comprises transmitting information relating to an open access point.

7. The method according to claim 6, wherein said plurality of receives comprises an item selected from the group consisting of: a 802.11 receiver, a WWAN (Wireless Wide Area Network) receiver, an FM receiver, and a short range wireless communication receiver.

8. The method according to claim 1, further comprising storing the information for subsequent use in said transmitting.

9. The method according to claim 1, wherein said information comprises obtaining an item selected from the group consisting of: a MAC address; a SSID; PTY/RDS data; and a WWAN cell phone tower ID.

10. The method of claim 1, wherein said location of the mobile computer is resolved by the remote device based on the information.

11. A mobile computer, comprising:
a plurality of receivers;
a CPU operatively coupled to the plurality of receivers;
a system memory in communication with said CPU; and
one or more modules executable by said CPU, wherein the one or more modules:
operate, responsive to receiving an incorrect login attempt at the mobile computer, a plurality of receivers to obtain information from two or more different types of wireless transmitting devices in a vicinity of the mobile computer when the mobile computer is not connected to a communications network;
wherein the information comprises two or more of: an access point Id, a cell phone tower ID, and signal strength information;
wherein at least two of the two or more wireless transmitting devices transmit data using different communication modalities;
transmit, after connecting to a communications network, the information from the mobile computer to a remote device; and
thereafter obtain a location of the mobile computer based on the information,
wherein the two or more different types of wireless transmitting devices comprise two or more fixed devices and mobile devices.

12. The mobile computer according to claim 11, wherein the one or more modules detect data indicative of an unauthorized access to the mobile computer prior to obtaining information from two or more different types of wireless transmitting devices in a vicinity of the mobile computer.

13. The mobile computer of claim 12, wherein said data indicative of an unauthorized access to the mobile computer comprises data indicating a predetermined number of failed login attempts.

14. The mobile computer of claim 11, wherein said information from two or more different types of wireless transmitting devices in a vicinity of the mobile computer comprises identification data.

15. The mobile computer of claim 14, wherein said information from two or more different types of wireless transmitting devices in a vicinity of the mobile computer comprises signal strength data.

16. The mobile computer of claim 11, wherein to operate the plurality of receivers comprises scanning for wireless transmitting devices in a vicinity of the mobile computer; and
wherein to transmit the information further comprises transmitting information relating to an open access point.

17. The mobile computer according to claim 16, wherein said plurality of receives comprises an item selected from the group consisting of: a 802.11 receiver, a WWAN (Wireless Wide Area Network) receiver, an FM receiver, and a short range wireless communication receiver.

18. The mobile computer according to claim 11, wherein the one or more modules store the information for subsequent use in said transmitting.

19. The mobile computer of claim 11, wherein said location of the mobile computer is resolved by the remote device based on the information.

20. A program storage device readable by machine and embodying a program of instructions executable by the machine to:
operate, responsive to receiving an incorrect login attempt at a mobile computer, a plurality of receivers of the mobile computer to obtain information from two or more different types of wireless transmitting devices in a vicinity of the mobile computer when the mobile computer is not connected to a communications network;
wherein the information comprises two or more of: an access point Id, a cell phone tower ID, and signal strength information;
wherein at least two of the two or more wireless transmitting devices transmit data using different communication modalities;
transmit, after connecting to a communications network, the information from the mobile computer to a remote device; and
thereafter obtain a location of the mobile computer based on the information,
wherein the two or more different types of wireless transmitting devices comprise two or more fixed devices and mobile devices.

* * * * *